United States Patent [19]
Miyo

[11] Patent Number: 4,934,983
[45] Date of Patent: Jun. 19, 1990

[54] DATA COMMUNICATION SYSTEM HAVING LEVEL CONTROL MEANS

[75] Inventor: Tokihiro Miyo, Kawasaki, Japan

[73] Assignee: Fujitsu Limited, Kawasaki, Japan

[21] Appl. No.: 98,238

[22] Filed: Sep. 18, 1987

[30] Foreign Application Priority Data

Sep. 20, 1986 [JP] Japan .................. 61-220905

[51] Int. Cl.$^5$ .............................................. H04B 3/36
[52] U.S. Cl. ........................................ 455/8; 455/10; 455/14; 455/17; 370/74
[58] Field of Search ........................................ 455/2-8, 455/10, 12, 14, 17, 68, 69; 370/74, 75, 76, 98

[56] References Cited

U.S. PATENT DOCUMENTS

| | | | |
|---|---|---|---|
| 3,993,952 | 11/1976 | Roza . | |
| 4,009,350 | 2/1977 | Cabet et al. | 370/74 |
| 4,038,600 | 7/1977 | Thomas | 455/12 X |
| 4,061,970 | 12/1977 | Magneron . | |
| 4,228,538 | 10/1980 | Scharla-Nielsen et al. | 455/12 X |
| 4,281,408 | 7/1981 | Bonnerot | 370/74 X |
| 4,512,033 | 4/1985 | Schrock | 455/2 |
| 4,752,967 | 6/1988 | Bustamante et al. | 455/69 X |

FOREIGN PATENT DOCUMENTS

| | | |
|---|---|---|
| 0163482 | 12/1985 | European Pat. Off. . |
| 2451387 | 5/1976 | Fed. Rep. of Germany . |
| 2500654 | 5/1976 | Fed. Rep. of Germany . |

OTHER PUBLICATIONS

*Radio Shack Dictionary of Electronics;* Rudolf Graf; 1974; page 429.
British Telecommunications Engineering, vol. 1, No. 2, Jul., 1982, "A New Earth Station at Goonhilly Downs for a Satellite Service to Ships", by M. Flack et al., Woking Surrey, GB; pp. 85-95.

*Primary Examiner*—Benedict V. Safourek
*Assistant Examiner*—Ralph Smith
*Attorney, Agent, or Firm*—Staas & Halsey

[57] ABSTRACT

In a data communication system, such as an earth station for a satellite communication system, a level control unit enables control of an amplitude of a data signal which is reduced in a cable, regardless of the form of the data signal. The data communication system includes a first system including a unit for sending a continuous signal having a first frequency and a data signal having second frequency, a cable, and a second system for receiving both sent signals through the cable. The second system includes a unit for correcting an amplitude of the data signal on the basis of an amplitude of the continuous signal to a predetermined level. The second system may also include a unit for further correcting the amplitude of the data signal on the basis of the frequency difference between the data signal and continuous signal, so that the amplitude is adjusted at the second frequency.

13 Claims, 3 Drawing Sheets

DATA COMMUNICATION SYSTEM HAVING LEVEL CONTROL MEANS

BACKGROUND OF THE INVENTION

1. Field of the Invention

The present invention relates to a data communication system. More particularly, it relates to an earth station for an artificial satellite data-communication system.

2. Description of the Related Art

A recent advance in satellite data communication technology allows direct satellite data communication between on-premise terminals and a hub station. In this system, a very small earth station having a small antenna with an aperture diameter of approximately 1.2 m is located at a subscriber's site, and the subscriber can then achieve direct data-communication with the hub station through an artificial satellite.

In this type of data communication system, the on-premise earth station should be as small as possible. In order to reduce the size of the earth station, outdoor equipment, including a transmitter and a receiver, may be mounted at the rear of the antenna and connected to an indoor terminal equipment through a coaxial cable, to form the earth station. Transmission and reception signals, both having an intermediate frequency (IF), are passed through the coaxial cable, together with a monitor signal for monitoring the outdoor equipment and a control signal for controlling the outdoor equipment.

The length of the coaxial cable depends on the distance between the indoor terminal equipment and the outdoor equipment. A long coaxial cable will cause a large attenuation of the level of the transmission IF signal, and accordingly, will reduce the power level of a transmission signal sent from the antenna of the earth station to the satellite. However, the power level of the transmission signal from the earth station, must be within a predetermined range, regardless of the attenuation in the coaxial cable, and thus a variety of methods of compensating the above attenuation are used.

The simplest method is to design the earth station by using a maximum length of coaxial cable, and to install that length of coaxial cable. If the distance between the indoor terminal equipment and the transmitter is shorter than this length, the surplus coaxial cable is coiled-up. This method, however, increases the costs of the coaxial cable installation and is difficult to install.

Another method is to correct the loss in the coaxial cable at each earth station, on the basis of the length of the coaxial cable, by using an amplifier. This method suffers from a drawback in that the measurement of the cable length must be precise and the correction value must be accurate. Normally, the correction amplifier is mounted on the rear of the antenna, together with the transmitter and is sealed by a waterproof covering. Any correction to the equipment necessitates opening the cover and a difficult adjustment of the amplifier.

In addition, in the above methods, a change in the loss due to a change of temperature occurs, and any change in the characteristics of the coaxial cable over a period of time cannot be corrected.

In an improvement of the above methods, an amplitude of the transmission IF signal is continuously detected and controlled to a constant value. This method is useful when applied to a continuous signal in, for example, a single channel per carrier (SCPC) communication system. However, in a time division multiple access (TDMA) communication system, the signal is sent as a periodical burst wave, and in a packet communication system, a signal is sent as an isolated burst wave. Accordingly, in those communication systems, the above simple level control cannot be adopted because they do not send a continuous signal.

SUMMARY OF THE INVENTION

An object of the present invention is to provide a level control system for a data communication system by which an amplitude of data which is reduced in a cable in the data communication system is controlled regardless of the signal form of the data.

Another object of the present invention is to provide a level control system which compensates a loss depending upon a frequency, in addition to the above control.

According to the present invention, there is provided a data communication system including a first system, a cable, and a second system operatively connected to the first system through the cable. The first system includes a unit for sending a continuous signal having a first frequency and a data signal having a second frequency to the second system through the cable. The second system includes a unit for correcting an amplitude of the data signal, on the basis of an amplitude of the continuous signal, to a predetermined level.

The second system may also include a unit further correcting the amplitudes of the data signal on the basis of a frequency difference between the first frequency and second frequency, so that the amplitude is adjusted at the second frequency.

The data communication system can be applied to an earth station system for a satellite communication system.

BRIEF DESCRIPTION OF THE DRAWINGS

Other objects and features of the present invention will be described below in detail with reference to the accompanying drawings, in which.

DESCRIPTION OF THE PREFERRED EMBODIMENT

Figure 1:
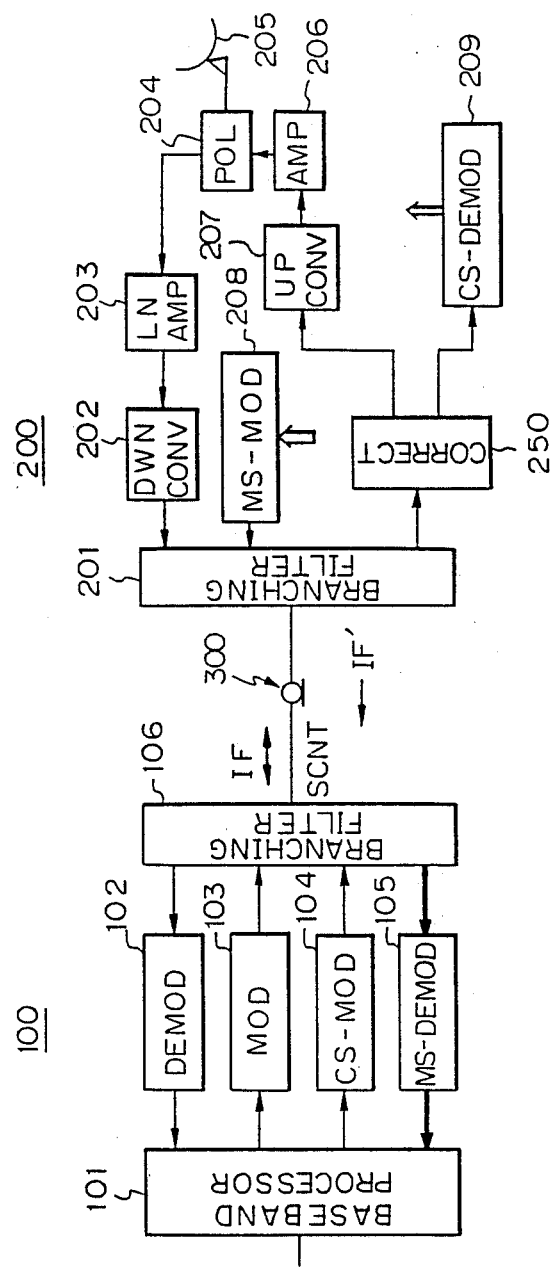
FIG. 1 is a block diagram of an embodiment of an earth station system for satellite communication, as an example of a data communication system according to the present invention.

FIG. 1 is a block diagram of an earth station system for satellite communication as an embodiment of a data communication system of the present invention. The earth station system includes indoor terminal equipment 100, a small outdoor earth station 200, and a coaxial cable 300 connecting therebetween.

The indoor terminal equipment 100 includes a base band processor 101 connectable to a terminal device (not shown), a demodulator 102, a modulator 103, a control signal modulator 104, a monitor signal demodulator 105, and a branching filter 106. The outdoor earth station 200 includes a branching filter 201, a small-size antenna 205, a polarization coupler 204, a low noise amplifier 203 and a down converter 202. The outdoor earth station 200 also includes an amplitude-correction circuit 250, an up converter 207, a power amplifier 206, a monitor signal modulator 208, and a control signal demodulator 209.

The operation of the earth station system of FIG. 1 is now described.

An intermediate frequency signal IF to be transmitted is output to the coaxial cable 300 through the modulator 103 and the branching filter 106. The output intermediate frequency signal IF is then received at the branching filter 201, extracted, and supplied to the up converter 207 through the amplitude-correction circuit 250. The operation of the amplitude-correction circuit 250 will be described later. The up converter 207 converts the supplied intermediate frequency signal IF to a signal having a radio frequency, and the converted radio frequency signal is amplified at the power amplifier 206 to a predetermined level needed for sending it to an artificial satellite (not shown). The amplified radio frequency signal is emitted from the antenna 205 through the polarization coupler 204. On the other hand, the antenna 205 receives another radio frequency signal transmitted from another earth station via the satellite (not shown). The received radio frequency signal is introduced to the low noise amplifier 203 through the polarization coupler 204. A signal output from the low noise amplifier 203 is converted to an intermediate frequency signal IF' at the down converter 202. The intermediate frequency signal IF' is output to the coaxial cable 300 through the branching filter 201. The intermediate frequency signal IF' is then received at the branching filter 106, extracted thereat, demodulated at the demodulator 102, and supplied to the baseband processor 101. The baseband processor 101 sends the baseband frequency signal to the terminal device.

The indoor terminal equipment 100 monitors the outdoor earth station 200. This monitoring is carried out through the control signal modulator 104, the monitor signal demodulator 105, the monitor signal modulator 208, and the control signal demodulator 209. These units output a control signal SCNT.

The intermediate frequency signal IF or IF' flows continuously when in the form of a continuous wave in, for example, an SCPC communication system. On the other hand, the intermediate frequency signal IF or IF' flows intermittently when in the form of a periodical burst wave in a TDMA communication system or an isolated burst wave in a packet communication system. Namely, the mode of the intermediate frequency signal depends on the type of modulation system (method) used. Normally, level control requires a continuous detection of a level of a signal to be controlled, and thus cannot be directly applied to an intermediate frequency signal in the form of a burst wave. Alternatively, the control signal SCNT flows continuously, regardless of the flow of the intermediate frequency signal. The control signal SCNT is subjected to a cable loss in the coaxial cable 300, which is similar to that of the intermediate frequency signal.

The amplitude-correction circuit 250 detects an amplitude of the control signal SCNT, calculates an attenuation value of the intermediate frequency signal IF from the indoor terminal equipment 100 on the basis of a reduction of the amplitude of the control signal, and then corrects the amplitude of the intermediate frequency signal IF. The amplitude-corrected intermediate frequency signal IF is amplified at the power amplifier 206 and sent to the satellite through the antenna 205.

The attenuation value in the coaxial cable 300 also depends on a frequency, and the above correction may be carried out on the basis of the frequency.

Figure 2:
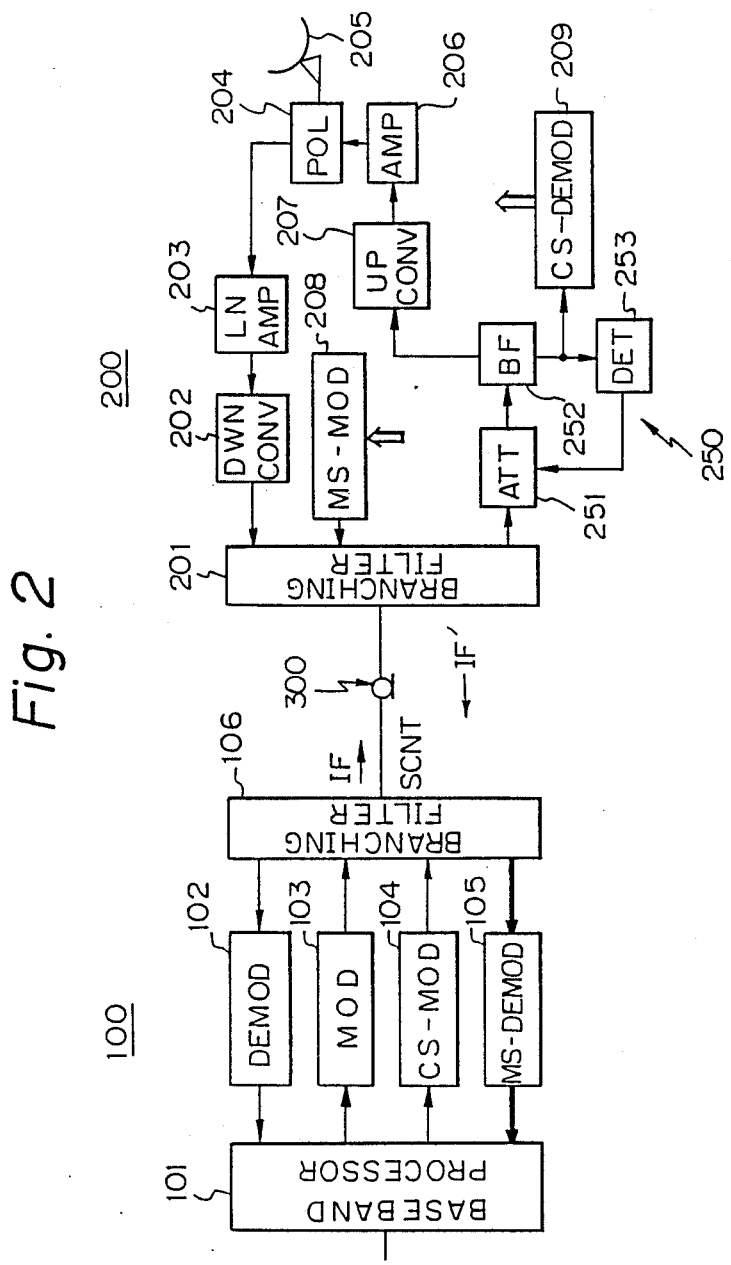
FIG. 2. is a block diagram of the embodiment of the earth station system shown in FIG. 1 in which a specific circuit construction of an amplitude-correction circuit is shown.

The description of the earth station system in FIG. 1 will be given in more detail with reference to FIG. 2.

Normally, the branching filter 201, the polarization coupler 204, the low noise amplifier 203, and the down converter 202 are installed at the rear of the small antenna 205, and form a front end receiver. The up converter 207 and the power amplifier 206 are also installed at the rear of the antenna 205. The branching filter 201, the up converter 207, the power amplifier 206 and the polarization coupler 204 form a front end transmitter. In addition, the monitor signal modulator 208, the control signal demodulator 209 and the amplitude-correction circuit 250 are installed at the rear of the antenna 205. The above devices may be accommodated in a box mounted at the rear of the antenna 205.

The amplitude-correction circuit 250 includes a variable attenuator (ATT) 251, a branching filter 252, and a detector 253. The variable attenuator 251 may be formed by a PIN diode.

The branching filter 252 branches an intermediate frequency modulation wave and supplies the same to the up converter 207. Also, the branching filter 252 branches the control signal SCNT and supplies the same to the detector 253 and the control signal demodulator 209.

The control signal is modulated by an ON-OFF keying (OOK) and a frequency shift keying (FSK), etc. When the control signal SCNT is modulated by the OOK at 41 MHz, the modulated control signal is detected by a peak-hold type detector 253. The peak-held and detected control signal is then fed back to the variable attenuator 251, thus keeping the amplitude of the control signal SCNT at a constant level. The intermediate frequency signal of, for example 70 MHz, passes through the variable attenuator 251 together with the control signal SCNT. Consequently, the level of the intermediate frequency signal is relatively adjusted thereat and amplified to a predetermined level at the power amplifier 206 after the conversion to a high frequency for transmission.

The above correction of the attenuation value of the intermediate frequency signal corrects not only for a cable loss at the coaxial cable but also for a temperature change, and a change due to a period of time elapsed, etc. Namely, the above correction is a total correction.

Figure 3:
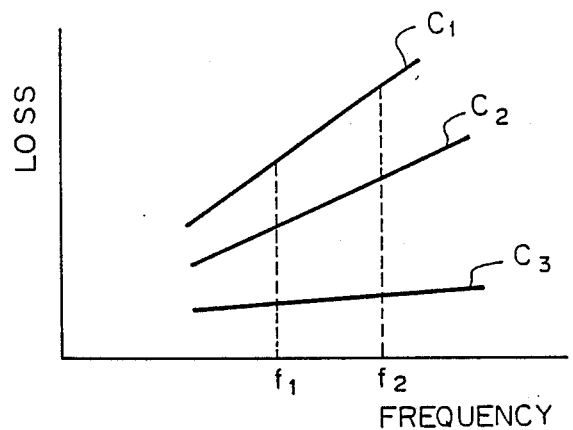
FIG. 3 is a graph representing the characteristics among a loss, a frequency, and a length of a coaxial cable; and, FIG. 4 is another circuit diagram of the amplitude-correction circuit shown in FIG. 2.

FIG. 3 shows graphs of losses in the coaxial cable 300. The abscissa represents a frequency of a signal, and the ordinate represents a loss. Curve $C_1$ represents the loss incurred when a length of the coaxial cable is relatively long. Curve $C_3$ represents the loss when the length of the coaxial cable is relatively short. Curve $C_2$ represents the loss when the length of the coaxial cable is between the above lengths. As is illustrated, the loss where the length is longest is greater than the loss where the length is shorter. In addition, the loss depends on the frequency, even for equal lengths of the coaxial cable. A high frequency results in a larger loss. Generally, the characteristic of the coaxial cable is expressed by $$\alpha/\sqrt{f},$$

where α represents a cable constant and f represents a frequency.

In the above embodiment, a frequency $f_2$ of the intermediate frequency signal is 70 MHz and a frequency $f_1$ of the control signal is 41 MHz, and the above correction is made under the frequency $f_1$. This is insufficient for an accurate correction of the amplitude of the intermediate frequency signal.

Figure 4:
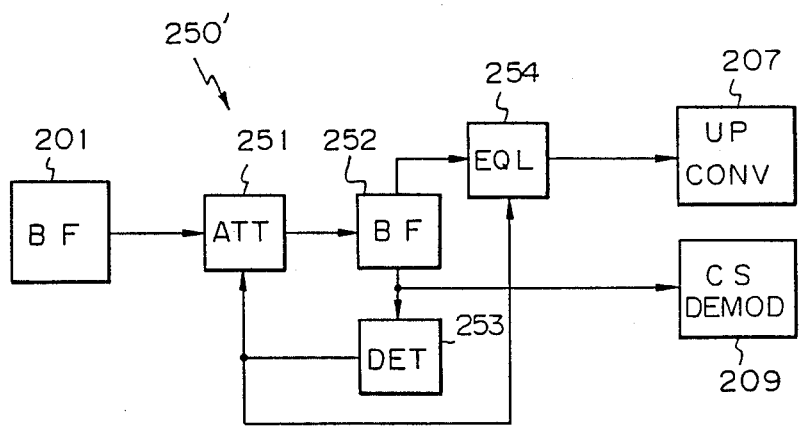

Referring to FIG. 4, another embodiment of an amplitude-correction circuit 250′, which enables an accurate correction of the intermediate frequency signal, will be described.

The amplitude-correction circuit 250′ includes a variable equalizer 254 in addition to the variable attenuator 251, the branching filter 252, and the detector 253. The variable equalizer 254 receives the intermediate frequency signal which has had the amplitude thereof adjusted at the variable attenuator 251 under the frequency $f_1$ and extracted by the branching filter 252. The equalizer 254 also receives the peak-held signal having the frequency $f_1$ and uses the same to carry out a feed-forward control of the received intermediate frequency signal, resulting in a further correction of the intermediate frequency signal, thus substantially resulting in a correction of the intermediate frequency signal under the frequency $f_2$.

The above description was given in connection with an earth station system for satellite communication, but the present invention can be applied to a variety of communication systems having a cable and needing a correction of a loss or an attenuation of a signal in the cable.

Many widely different embodiments of the present invention may be constructed without departing from the spirit and scope of the present invention. It should be understood that the present invention is not limited to the specific embodiments described in this specification, except as defined in the appended claims.

I claim:

1. A data communication system comprising:
   a first system;
   a cable; and
   a second system operatively connected to said first system through said cable;
   said first system including first means for sending a continuous modulated control signal having a first frequency and a data signal having a second frequency to said second system through said cable, and
   said second system including
      second means for correcting an amplitude of said data signal to a predetermined level on the basis of an amplitude of said continuous modulate control, said second means comprising a variable level adjustment circuit for adjusting said continuous modulated control signal and said data signal and outputting a level adjusted continuous modulated control signal and a level adjusted data signal, and a detector, operatively connected to said level adjustment circuit, for detecting said amplitude of said continuous modulated control signal, and
      demodulating means, operatively connected to said second means, for demodulating said level adjusted continuous modulated control signal,
   wherein said variable level adjustment circuit adjusts said amplitude of said continuous modulated control signal and said amplitude of said data signal on the basis of said detected amplitude of said continuous modulated control signal.

2. A data communication system according to claim 1, wherein said variable level adjustment circuit comprises a PIN diode.

3. A data communication system according to claim 1, wherein said detector comprises a peak holder.

4. A data communication system according to claim 1, wherein said second means further comprises a branching circuit between said variable level adjustment circuit and said detector, said branching circuit receiving said level adjusted continuous modulated control signal and data signal and branching the received signals, said branched continuous modulated control signal being supplied to said detector.

5. A data communication system according to claim 1, wherein said second means further corrects said amplitude of said data signal on the basis of a frequency difference between said first frequency and said second frequency so that said amplitude of said data signal is adjusted based on said second frequency.

6. A data communication system according to claim 1, wherein said cable comprises a coaxial cable.

7. A data communicating system comprising:
   a first system;
   a cable; and
   a second system operatively connected to said first system through said cable;
   said first system including first means for sending a continuous modulated control signal having a first frequency and a data signal having a second frequency to said second system through said cable, and
   said second system including second means for correcting an amplitude of said data signal to a predetermined level on the basis of an amplitude of said continuous modulated control signal and on the basis of a frequency difference between said first frequency and said second frequency so that said amplitude of said data signal is adjusted based on said second frequency, said second means comprising
      a variable level adjustment circuit for adjusting said continuous modulated control signal and said data signal,
      a branching circuit operatively connected to said variable level adjustment circuit, for receiving said continuous modulated control signal and data signal, amplitude adjusted at said level adjustment circuit, and branching the received signals on the basis of a frequency difference therebetween,
      a detector, operatively connected to said branching circuit to receive said amplitude adjusted continuous modulated control signal, for detecting an amplitude of said amplitude adjusted continuous modulated control signal, and
      a variable equalizer, operatively connected to said branching circuit and said detector, receiving said amplitude adjusted data signal from said branching circuit and the detected signal from said detector,
   wherein said variable level adjustment circuit receives the detected signal from said detector and adjusts said amplitude of said amplitude adjusted continuous modulated control signal and said amplitude of said amplitude adjusted data signal on the basis of said detected amplitude of said amplitude adjusted continuous modulated control signal from said detector, and said variable equalizer further adjusts said amplitude of said amplitude adjusted data signal on the basis of said detected signal having said first frequency and said second frequency of said data signal, so that said frequency difference is compensated to adjust said amplitude of said data signal for said second frequency.

8. A data communication system according to claim 7, wherein said variable level adjustment circuit comprises a PIN diode.

9. A data communication system according to claim 7, wherein said detector comprises a peak holder.

10. An earth station system for a satellite communication system, comprising:
   an indoor terminal equipment;
   a coaxial cable; and
   an outdoor earth station operatively connected to said terminal equipment through said coaxial cable and including an antenna and a control signal demodulator,
   said terminal equipment including a first branching filter connected to said coaxial cable, a modulator for outputting a modulated transmission signal having an intermediate frequency to said outdoor earth station through said branching filter and said coaxial cable, and a control signal modulator for outputting a continuous modulated control signal, having a frequency different from said intermediate frequency and used for controlling said outdoor earth station, to the control signal demodulator in said outdoor earth station through said first branching filter,
   said outdoor earth station including a second branching filter connected to said coaxial cable, an amplitude-correction circuit operatively connected to said second branching filter, an up converter for converting said intermediate frequency of said transmission signal received through said amplitude-correction circuit to a radio frequency for transmitting said transmission signal from said antenna, and a power amplifier for receiving said frequency converted transmission signal, amplifying an amplitude of said frequency converted transmission signal by a constant amplification factor and supplying the amplified transmission signal to said antenna,
   said amplitude-corrected circuit in said outdoor earth station comprising a variable level adjustment circuit which receives said continuous modulated control signal and said modulated transmission signal, and a detector, operatively connected to said variable level adjustment circuit, for detecting an amplitude of said continuous modulated control signal, said variable level adjustment circuit adjusting said amplitude of said continuous modulated control signal and an amplitude of said modulated transmission signal on the basis of said detected amplitude from said detector, and outputting an amplitude adjusted continuous modulated control signal and an amplitude adjusted transmission signal.

11. An earth station system according to claim 10, wherein said variable level adjustment circuit comprises a PIN diode.

12. An earth station system according to claim 10, wherein said detector comprises a peak holder.

13. An earth station system according to claim 11, wherein said amplitude-correction circuit further comprises
   a branching circuit operatively connected to said variable level adjustment circuit, for receiving said continuous modulated control signal and said modulated transmission signal, amplitude adjusted at said variable level adjustment circuit, and branching the received signals on the basis of a frequency difference therebetween, said detector, operatively connected to said branching circuit, receiving said continuous modulated control signal and detecting said amplitude of said continuous modulated control signal, and
   a variable equalizer, operatively connected to said branching circuit and said detector, for receiving said modulated transmission signal, and
   further adjusting said amplitude of said modulated transmission signal on the basis of said detected signal having said frequency and said intermediate frequency, so that said frequency difference is compensated to adjust said amplitude of said modulated transmission signal for said amplitude at said intermediate frequency.

* * * * *

UNITED STATES PATENT AND TRADEMARK OFFICE
CERTIFICATE OF CORRECTION

PATENT NO. : 4,934,983
DATED      : JUNE 19, 1990
INVENTOR(S): TOKIHIRO MIYO

It is certified that error appears in the above-identified patent and that said Letters Patent is hereby corrected as shown below:

```
Col. 1, line 25, delete "an";
        line 38, "station," should be --station--.

Col. 2, line 52, "and," should be --and--.

Col. 4, line 52, delete "and".

Col. 5, line  1, "a" should --a--; and "f" should be --f--;
        line 59, "modulate" should be --modulated--;
        line 60, "control," should be --control signal,--.
```

Signed and Sealed this

Fifth Day of November, 1991

Attest:

HARRY F. MANBECK, JR.

*Attesting Officer*  Commissioner of Patents and Trademarks